(12) United States Patent
Juels et al.

(10) Patent No.: US 8,635,465 B1
(45) Date of Patent: Jan. 21, 2014

(54) COUNTER-BASED ENCRYPTION OF STORED DATA BLOCKS

(75) Inventors: Ari Juels, Brookline, MA (US); Alina M. Oprea, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 8 days.

(21) Appl. No.: 13/432,577

(22) Filed: Mar. 28, 2012

(51) Int. Cl.
*G06F 12/14* (2006.01)

(52) U.S. Cl.
USPC .......................................... 713/193

(58) Field of Classification Search
None
See application file for complete search history.

(56) References Cited

U.S. PATENT DOCUMENTS

2007/0189522 A1* 8/2007 Raju et al. ........................ 380/37
2011/0264906 A1* 10/2011 Pourzandi et al. ............ 713/153

OTHER PUBLICATIONS

K.D. Bowers et al., "HAIL: A High-Availability and Integrity Layer for Cloud Storage," 16th ACM Conference on Computer and Communications Security (CCS), Nov. 2009, pp. 187-198.
H. Shacham et al., "Compact Proofs of Retrievability," Proceedings of Asiacrypt, Report 2008/073, Dec. 2008, pp. 1-36.
U.S. Appl. No. 13/075,848 filed in the name of A, Juels et al. Mar. 30, 2011 and entitled "Remote Verification of File Protections for Cloud Data Storage."

* cited by examiner

*Primary Examiner* — Cordelia Zecher
(74) *Attorney, Agent, or Firm* — Ryan, Mason & Lewis, LLP

(57) ABSTRACT

A processing device is configured to maintain counters for respective stored data blocks, and to encrypt a given one of the data blocks utilizing a value of the data block in combination with a value of its associated counter. The encryption may comprise a homomorphic encryption operation performed on the given data block as a function of the value of that data block and the value of its associated counter, with the homomorphic encryption operation comprising an operation such as addition or multiplication performed over a designated field. A given one of the counters is incremented each time the corresponding data block is subject to an update operation. The data block can be encrypted, for example, by combining a value of that data block with an additional value determined using the associated counter value, such as a one-time pad value determined as a function of the counter value.

21 Claims, 3 Drawing Sheets ered by a cloud service provider, by maintaining counters for the respective stored data blocks and utilizing the counter values in encrypting the data blocks. The data blocks may comprise respective database records or other data files, or portions of such files.

COUNTER-BASED ENCRYPTION OF STORED DATA BLOCKS

FIELD

The field relates generally to cryptography, and more particularly to techniques for encrypting of stored data.

BACKGROUND

An increasing number of companies and other enterprises are reducing their costs by migrating portions of their information technology infrastructure to cloud service providers. For example, virtual data centers and other types of systems comprising distributed virtual infrastructure are coming into widespread use. Typical cloud service offerings include, for example, Infrastructure-as-a-Service (IaaS), Platform-as-a-Service (PaaS), and Software-as-a-Service (SaaS).

In cloud-based information processing systems, enterprises in effect become tenants of the cloud service providers. However, by relinquishing control over their information technology resources, these cloud tenants expose themselves to additional potential security threats. As one illustration, a given tenant may be inadvertently sharing physical hardware resources of a cloud computing environment with other tenants that could be competitors or attackers. Similar issues arise in other types of information processing systems in which computing environments or other types of information technology infrastructure are shared by multiple tenants.

It is therefore important that tenant files entrusted to a cloud service provider be subject to appropriate security protections. For example, the tenant may require that its files be stored in an encrypted format.

Techniques for allowing a tenant to verify that its files are subject to appropriate security protections by the cloud service provider are disclosed in U.S. patent application Ser. No. 13/075,848, filed Mar. 30, 2011 and entitled "Remote Verification of File Protections for Cloud Data Storage," which is commonly assigned herewith and incorporated by reference herein. Illustrative systems disclosed therein implement file protection verification functionality using an "hourglass" protocol that provides an efficient and accurate technique for verifying that files stored by cloud storage providers are subject to appropriate protections such as encryption. The hourglass protocol is configured to ensure that transformation of a given file from one format to another is subject to minimum resource requirements. As a result, a cloud storage provider cannot, for example, store a file in unencrypted form and then encrypt it only upon receipt of a verification request from the tenant.

Despite these advances, a need remains for further improvements in secure data storage, particularly for tenants of cloud service providers.

SUMMARY

Illustrative embodiments of the present invention provide improved security for stored data blocks, such as those that are stored for a given tenant in cloud infrastructure of a cloud service provider, by maintaining counters for the respective stored data blocks and utilizing the counter values in encrypting the data blocks. The data blocks may comprise respective database records or other data files, or portions of such files.

In one embodiment, a processing device is configured to maintain counters for respective stored data blocks, and to encrypt a given one of the data blocks utilizing a value of the data block in combination with a value of its associated counter. The encryption may comprise a homomorphic encryption operation performed on the given data block as a function of the value of that data block and the value of its associated counter, with the homomorphic encryption operation comprising an operation, such as addition or multiplication, performed over a Galois field or other designated field. A given one of the counters is incremented, for example, each time the corresponding data block is subject to an update operation.

The data block can be encrypted, for example, by combining a value of that data block with an additional value determined using the associated counter value. As a more particular example, the stored data blocks may have respective values $m_1, \ldots m_n$ arranged in an array of n values and the corresponding counters maintained for those data blocks may have respective values $c_1, \ldots c_n$. In such an arrangement, an i-th one of the data blocks may be encrypted by combining the data block value $m_i$ with an additional value determined as a function of the counter value $c_i$.

In an embodiment in which the homomorphic encryption is based on addition operations, a sum of multiple encrypted data block values is computed and the sum is transmitted to a receiver. The receiver can then verify appropriate storage of the data blocks by decrypting the received sum and comparing that result to its own independent computation of the sum of the unencrypted data block values.

Similarly, in an embodiment in which the homomorphic encryption is based on multiplication operations, a product of multiple encrypted data block values is computed and the product is transmitted to a receiver. The receiver can then verify appropriate storage of the data blocks by decrypting the received product and comparing that result to its own independent computation of the product of the unencrypted data block values.

One or more of the illustrative embodiments described herein provide enhanced security for stored tenant data through the use of homomorphic encryption based on counter values maintained for respective stored data blocks. Advantageously, such embodiments exhibit substantially reduced computational complexity relative to conventional homomorphic encryption techniques, such as Paillier encryption, that are implemented using public-key cryptography. As a result, the disclosed arrangements can considerably facilitate tenant interaction with data entrusted to a cloud service provider, although such arrangements are more generally useful in a wide variety of other secure data storage applications.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
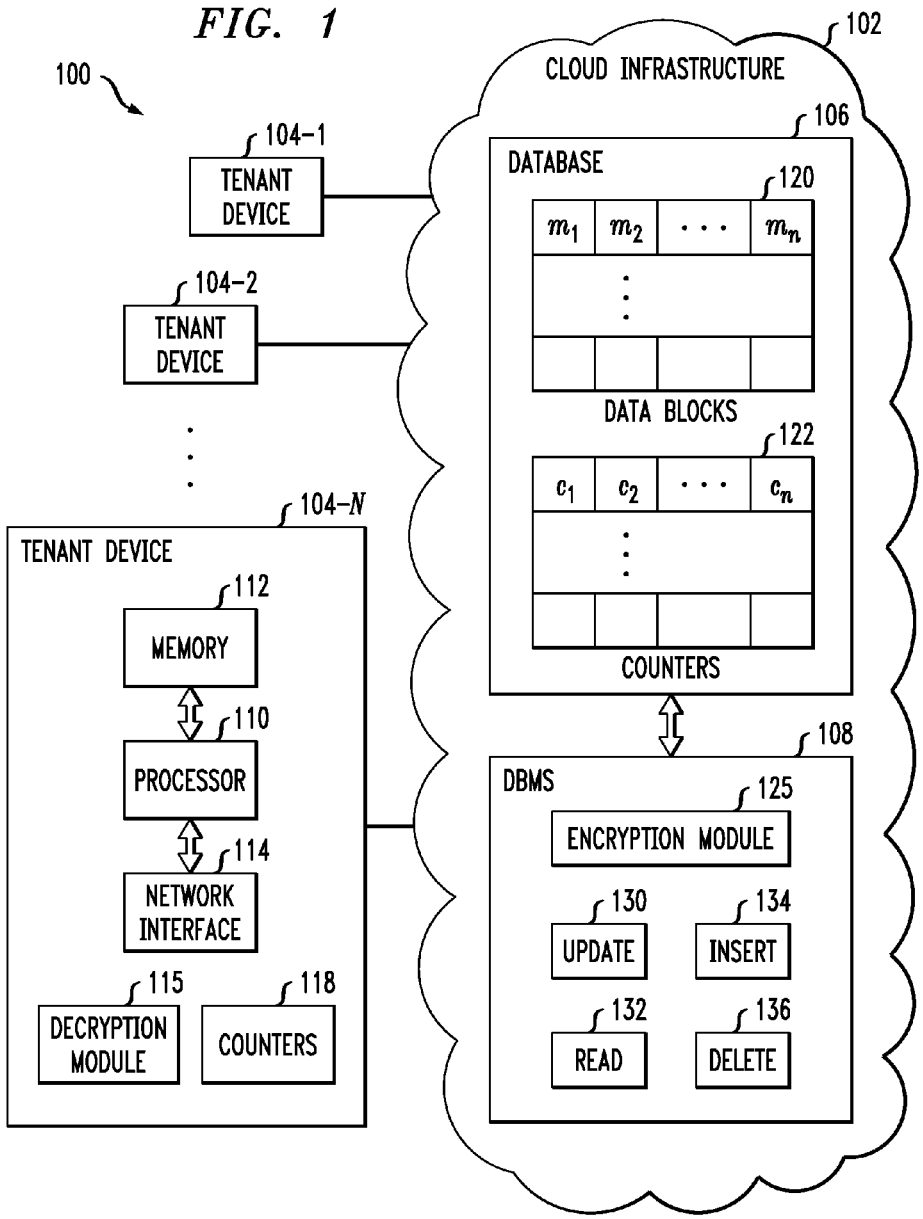
FIG. 1 is a block diagram of information processing system implementing counter-based encryption of stored data blocks in an illustrative embodiment of the invention.

FIG. 1 shows an information processing system 100 configured in accordance with an illustrative embodiment of the present invention. The information processing system 100 comprises cloud infrastructure 102. Tenants associated with respective tenant devices 104-1, 104-2, . . . 104-N utilize services provided by the cloud infrastructure 102, and the tenant devices may be configured to access the cloud infrastructure via a network or other communication channel. The term "tenant" as used herein is intended to be broadly construed, and may be used to refer to a user or other entity, its associated device or both. The same reference numeral 104 will be used for all of these cases.

The cloud infrastructure 102 may comprise, for example, software products running on a processing platform of a cloud service provider, although other types of products, including hardware products or virtualized products, may additionally or alternatively be utilized by at least a subset of the tenants 104. The cloud infrastructure 102 may be viewed as comprising physical infrastructure and associated virtualization infrastructure running on the physical infrastructure.

The cloud infrastructure 102 or portions thereof may be implemented using one or more processing devices of a processing platform. Examples of processing platforms that may form portions of the cloud infrastructure 102 in system 100 will be described in more detail below in conjunction with FIGS. 3 and 4.

In the present embodiment, the cloud infrastructure implements a database 106 and an associated database management system (DBMS) 108. The database is assumed to comprise a cloud database used to store data for the one or more of the tenants 104. Multiple tenants may have respective allocated file space within the database 106. Alternatively, a separate instance of database 106, and possibly database management system 108, may be provided for each of the tenants 104.

The tenant devices 104 may be implemented as respective processing devices. A given such processing device may comprise, for example, a computer, a mobile telephone or other type of communication device.

A given cloud infrastructure or tenant processing device generally comprises at least one processor and an associated memory, and includes one or more functional modules for controlling certain features of the system 100.

The system 100 in the present embodiment implements a process for counter-based encryption of stored data blocks. An example of such a process performed utilizing the database 106 and database management system 108 of cloud infrastructure 102 will be described in conjunction with FIG. 2, but it is to be appreciated that numerous other types of processes may be used in other embodiments.

A given one of the tenant devices 104-1 in the present embodiment more particularly comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination. The memory 112 and other memories disclosed herein may be viewed as examples of what are more generally referred to as "computer program products" storing executable computer program code.

Also included in the tenant device 104-1 is network interface circuitry 114. The network interface circuitry 114 allows the tenant device 104-1 to communicate over one or more networks with the cloud infrastructure 102, and possibly with the other tenant devices 104, and may comprise one or more conventional transceivers.

The tenant device 104-1 further includes a decryption module 115 and a set of counters 118 that may be utilized in conjunction with decryption of encrypted data blocks that have been stored in database 106 using counter-based encryption. The decryption module 115 and counters 118 may be implemented at least in part in the form of software that is stored in memory 112 and executed by processor 110.

The other tenant devices 104 of the system 100 are assumed to be configured in a manner similar to that shown for tenant device 104-1 in the figure.

As mentioned above, the tenant devices 104 may access the cloud infrastructure 102 over a network, which may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The database 106 of cloud infrastructure 102 comprises stored data blocks 120 that have respective associated counters 122. The counters 122 are maintained for respective ones of the stored data blocks 120, and the data blocks are each encrypted utilizing a value of the data block in combination with a value of its associated counter.

The data blocks 120 may comprise respective database records or other data files, or portions of such files. As illustrated in the figure, the data blocks include a row of data blocks having respective values $m_1, \ldots m_n$ and the corresponding counters maintained for those data blocks have respective values $c_1, \ldots c_n$. It should be noted that the term "data block value" as used herein is intended to be broadly construed, and may represent, for example, a value of a corresponding portion of a data block.

Although each data block in the set of data blocks 120 is assumed to have an associated counter in the present embodiment, other embodiments need not be configured in this particular illustrative manner. For example, the database 106 may maintain counters for only a subset of the stored data blocks 120. Thus, portions of the stored data blocks of the database 106 may utilize counter-based encryption of the type disclosed herein, while other portions may use other encryption techniques or may be unencrypted.

The database management system 108 comprises an encryption module 125 which in this embodiment encrypts the stored data blocks 120 utilizing values of the respective counters 122, as will be described in greater detail below in conjunction with FIG. 2. The database management system 108 also performs various operations on the stored data blocks, including, for example update, read, insert and delete operations performed using respective update, read, insert and delete operations 130, 132, 134 and 136. The update operation is intended to be broadly construed so as to encompass any type of database operation that results in alteration of the value of a given stored data block. The read operation involves retrieving a given stored data block. The insert and delete operations involve respective inserting and deleting of data blocks from the database. Numerous other database operations may be performed on one or more of the data blocks by the database management system 108, as would be appreciated by those skilled in the art.

Also, the encryption module 125 need not be implemented in the database management system 108 as shown, but could instead be implemented at least in part in other system elements in other embodiments.

The encryption of the data blocks 120 generally involves performing a homomorphic encryption operation on a given data block as a function of the value of that data block and the value of its associated counter, where the homomorphic encryption operation comprises, for example, addition or multiplication performed over a designated group or other type of field. For example, addition or multiplication operations for homomorphic encryption may be performed over a Galois field.

In an embodiment in which the homomorphic encryption is based on addition operations, such as those described below in conjunction with FIG. 2, a sum of multiple encrypted data block values is computed and the sum is transmitted to the appropriate tenant device 104. The tenant device can then verify appropriate storage of the data blocks by decrypting the received sum and comparing that result to its own independent computation of the sum of the unencrypted data block values.

Similarly, in alternative embodiments in which the homomorphic encryption is based on multiplication operations, a product of multiple encrypted data block values is computed and the product is transmitted to the appropriate tenant device 104. The tenant device can then verify appropriate storage of the data blocks by decrypting the received product and comparing that result to its own independent computation of the product of the unencrypted data block values.

As will be described, the encryption module 125 may be configured to encrypt an i-th one of the data blocks by combining the data block value $m_i$ with an additional value determined as a function of the corresponding counter value $c_i$.

A sum, product or other function of the n resulting encrypted data block values is then transmitted to the appropriate tenant device 104, such that the tenant device can verify appropriate storage in the manner described previously. Decryption of the received sum or product involves use of the counter values $c_1, \ldots c_n$, and these values may be transmitted from the cloud infrastructure 102, or separately tracked by the tenant device 104 using its set of counters 118.

The counters 122 are maintained for the respective data blocks 120 by incrementing a given one of the counters each time the corresponding data block is subject to a designated operation, such as an update operation performed on the data block, although other techniques for maintaining the counters based on operations performed on the associated data blocks may be used.

It is to be appreciated that the particular set of elements shown in FIG. 1 for providing counter-based encryption of data blocks is presented by way of example, and in other embodiments additional or alternative elements may be used. Thus, another embodiment may include additional sets of tenant devices or cloud infrastructure.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

The operation of the system 100 will now be described in greater detail with reference to the flow diagram of FIG. 2, which illustrates a set of operations performed by the cloud infrastructure 102 in an illustrative embodiment.

The process as shown includes steps 200, 202, 204, 206 and 208, which are assumed to be performed using elements of the cloud infrastructure such as database 106 and database management system 108, although in other embodiments one or more such steps may be implemented at least in part by other system elements.

In step 200, the values of the counters 122 are initialized. For example, counter values $c_1, \ldots c_n$ may be set to zero, or to one or more other predetermined values.

In step 202, a determination is made as to whether an update has been performed on any data block. If an update has been performed on a given data block, the value of the associated counter is incremented in step 204. Otherwise, the process bypasses step 204 for the given data block and proceeds to step 206. Steps 202 and 204 can be repeated for each of a plurality of the data blocks that have been updated.

It should be noted that updates to the database 106 may be performed in batches, in which case the counter values can be compressed by storing counter intervals, where a given counter interval may specify an interval of successive data blocks that have the same value of the counter.

Such counter values can be stored in a data structure comprising first and second arrays, with the first array storing the start of counter intervals and the second array storing the counter values. For many realistic workloads, one could highly compress the counter values by storing counter intervals in this representation. Other types of data structures that represent the counter values compactly and support efficient insertion, modification and search of counter values could alternatively be used, e.g., version trees.

In step 206, a determination is made as to whether one or more data blocks are to be encrypted. If a given data block is to be encrypted, that data block is encrypted utilizing a value of the data block in combination with a value of its associated counter in step 208. Otherwise, the process bypasses step 208 for the given data block and returns to step 202 to check for a subsequent update. Steps 206 and 208 can be repeated for each of a plurality of the data blocks to be encrypted.

Figure 2:
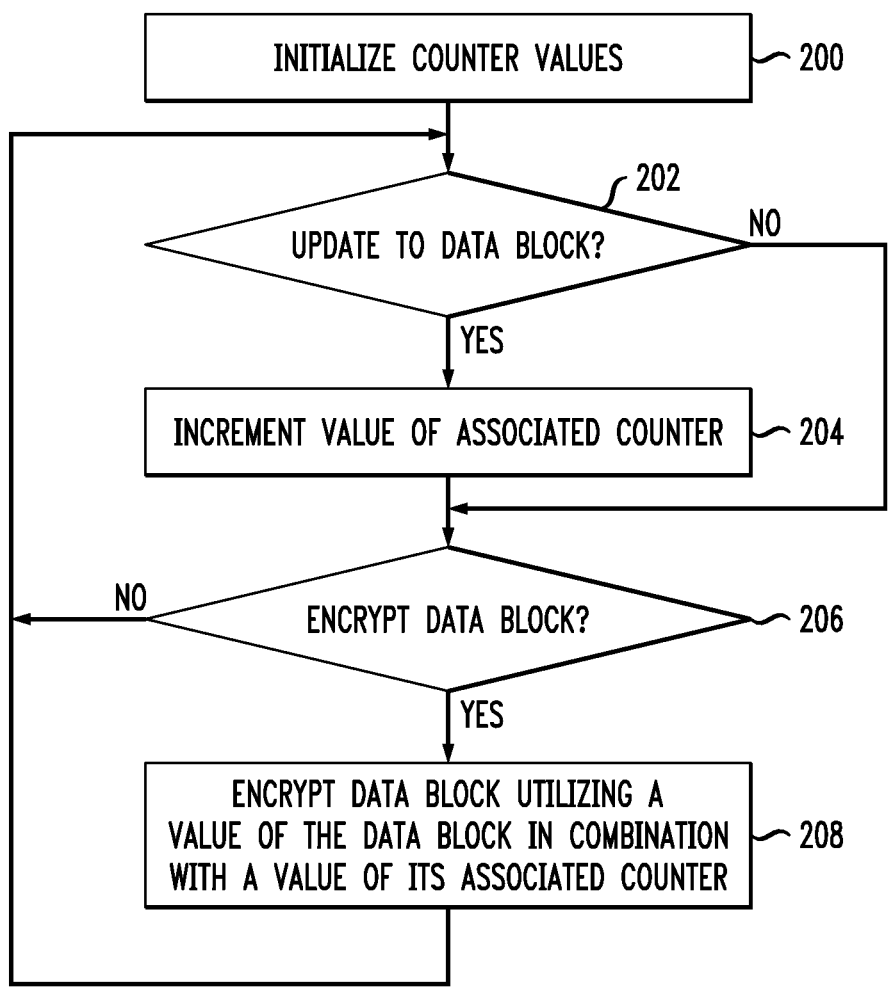
FIG. 2 is a flow diagram of a process for counter-based encryption of stored data blocks in the system of FIG. 1.

The process as illustrated in FIG. 2 may be repeated serially for each of a plurality of data blocks, or may be performed in parallel for multiple data blocks.

In the encrypting step 208, an i-th one of the data blocks is encrypted by combining the data block value $m_i$ with an additional value determined as a function of the counter value $c_i$. The additional value may comprise, for example, a one-time pad value determined as a function of the counter value $c_i$. As a more particular example, the additional value may be a pseudo-random function of the counter value $c_i$, such that the corresponding encrypted data block is computed by encryption module 125 in accordance with the following equation:

$$e_i = m_i + \mathrm{PRF}_k(i, c_i),$$

where $e_i$ denotes the encrypted data block, $\mathrm{PRF}_k$ denotes a pseudo-random function over a symmetric key k, and the addition operation is performed over a designated field, such as a Galois field. In other embodiments, other designated groups or fields may be used in performing a given homomorphic operation. Also, other types of homomorphic operations may be used in place of or in conjunction with an addition operation of the type used in the above example, including multiplication.

The one-time pads generated using the pseudo-random function should be unique for each update to the set of data blocks 120. The addition operation in this example is assumed to be performed over a Galois field such as $GF(2^{256})$ but as indicated previously could instead be performed over any other group or field supporting addition. The pseudo-random function can be instantiated using a block cipher such as AES. The key k is assumed to be a strong cryptographic key (e.g., an AES key) managed by the appropriate tenant.

Assuming that the encrypting step 208 is performed on each of the n data block values $m_1, \ldots m_n$, information characterizing the encrypted values and the associated counter values $c_1, \ldots c_n$ may be transmitted to a designated receiver, illustratively a particular one of the tenant devices 104 for which the data blocks were stored, such that the tenant device can utilize its decryption module 115 to decrypt the encrypted data block values by removal of the additional values computed using the respective counter values.

The information characterizing the encrypted values, in the case of homomorphic addition operations of the type described above, may be a sum of the encrypted data block values computed as follows:

$$\Sigma_i e_i = \Sigma_i (m_i + PRF_k(i, c_i)).$$

Further assuming that counter values $c_1, \ldots c_n$ are known to the tenant device, the tenant device can decrypt by stripping off the PRF values. Thus, the tenant device decrypts the received sum $\Sigma_i e_i$ and compares that result to its own independent computation of the sum of the n unencrypted data block values $m_1, \ldots m_n$.

Instead of receiving the counter values $c_1, \ldots c_n$ from the cloud infrastructure 102, the tenant device can independently track the counter values $c_1, \ldots c_n$ using its own set of counters 118, which are maintained by the tenant device using its knowledge of update operations performed on its stored data blocks in database 106. In such an arrangement, the counter values are not transmitted to the tenant device. Instead, only the information characterizing the encrypted values is transmitted. The receiver uses this information and its own set of counters 118 to decrypt the encrypted data block values in decryption module 115 by removal of the additional values computed using the respective counter values.

Hybrid approaches may also be used, in which the counter values are stored in the cloud infrastructure 102, but cached at the tenant device after each encryption operation. When a new encryption operation is performed, the tenant only needs to know for each data block the number of updates performed in the time interval since the previous encryption operation. Assuming that the tenant keeps some history of recently performed operations (e.g., in system log files), the most recent counter values can generally be obtained without significant additional communication cost.

Other arrangements of data blocks may be used in other embodiments. For example, in another embodiment the data blocks 120 have respective values $m_{ij}$ arranged in a two-dimensional n-by-r array of values, $1 \leq i \leq n$ and $1 \leq j \leq r$, and the corresponding counters 122 maintained for those data blocks have respective values $c_{ij}$. In an embodiment of this type, the encrypting step 208 comprises encrypting an i,j-th one of the data blocks by combining the data block value $m_{ij}$ with an additional value determined as a function of the counter value $c_{ij}$. Again, the additional value may comprise a one-time pad value determined as a function of the counter value $C_{ij}$. More particularly, the additional value may be a pseudo-random function of the counter value $c_{ij}$, such that the corresponding encrypted data block is computed by encryption module 125 in accordance with the following equation:

$$e_{ij} = m_{ij} + PRF_k(i, j, c_{ij}),$$

where $e_{ij}$ denotes the encrypted data block, $PRF_k$ denotes a pseudo-random function over a symmetric key k, and the addition operation is performed over a designated field. The sum $\Sigma_{ij} e_{ij}$ of the encrypted data block values is then computed and transmitted to the tenant device, and decrypted by the tenant device to determine the sum of the unencrypted values $m_{ij}$ in a manner similar to that previously described. Again, multiplication operations or other types of operations over a designated field may be used in place of the addition operations used in the above examples.

The counters 122 may additionally or alternatively be used to provide integrity protection for respective ones of the stored data blocks 120. For example, a message authentication code (MAC) may be stored for a given one of the data blocks, with the MAC being computed over index i, data block value $m_i$ and corresponding counter value $c_i$ using a secret key associated with the appropriate tenant. The secret key is therefore illustratively known only to the particular tenant device 104 on whose behalf the data blocks are stored in the cloud infrastructure 102. The data block may then be authenticated using the corresponding stored MAC. The MAC is updated with each update of the corresponding data block value $m_i$.

This technique provides strong data integrity, and in particular a property referred to as freshness: At each read operation, it guarantees that the latest value of the accessed data block has been retrieved from the database.

MACs generated for multiple respective stored data blocks can be combined into a composite MAC in order to conserve storage space. This may involve, for example, use of known homomorphic MAC techniques.

The particular processing operations and other system functionality described in conjunction with the flow diagram of FIG. 2 are presented by way of illustrative example only, and should not be construed as limiting the scope of the invention in any way. Alternative embodiments can use other types of processing operations for counter-based encryption of data blocks. For example, the ordering of the process steps may be varied in other embodiments, or certain steps may be performed concurrently with one another rather than serially. Also, one or more of the process steps may be repeated periodically. For example, the counter values may be periodically re-initialized in step 200.

It is to be appreciated that counter-based encryption functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments exhibit substantially reduced computational complexity relative to conventional homomorphic encryption techniques, such as Paillier encryption, that are implemented using public-key cryptography. As a result, these embodiments facilitate the implementation of secure data storage in numerous applications, and particularly for tenant data entrusted to a cloud service provider.

Figure 3:
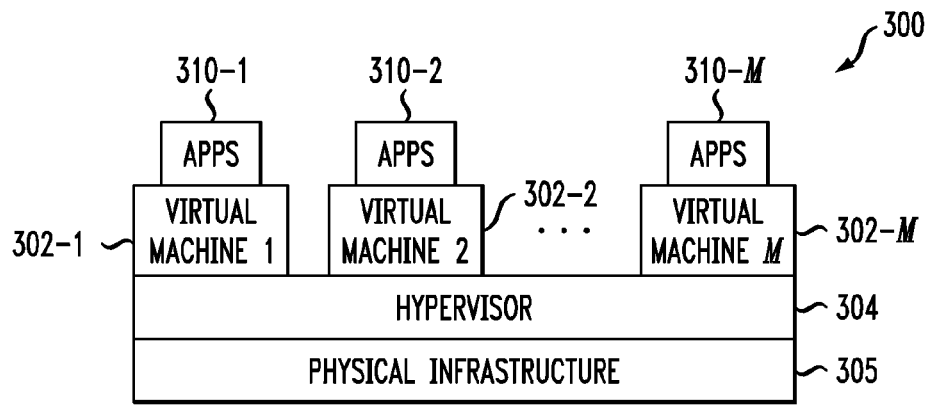
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the infrastructure 102. Thus, the tenant devices 104 may be viewed as comprising one or more of the virtual machines 302.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the cloud infrastructure 102 of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the cloud infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Figure 4:
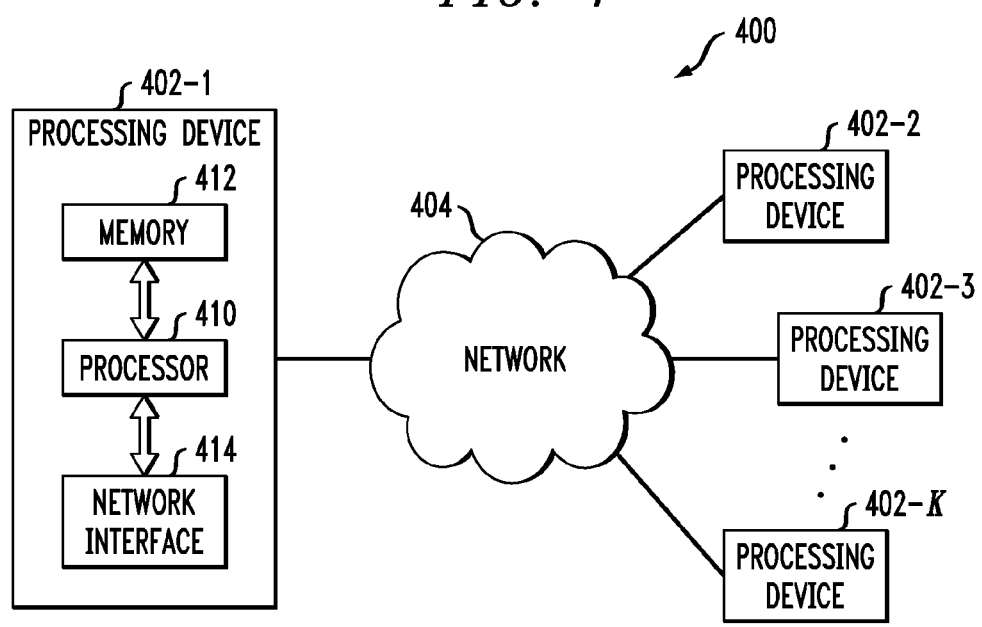

Multiple elements of information processing system 100 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of devices and systems that can benefit from counter-based encryption of data blocks. Also, the particular configuration of system and device elements shown in FIGS. 1, 3 and 4, and the counter-based encryption process shown in FIG. 2, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
maintaining counters for respective stored data blocks; and
encrypting a given one of the data blocks utilizing a value of the data block in combination with a value of its associated counter;
wherein the maintaining and encrypting steps are performed by a processing device having a processor coupled to a memory; and
wherein the encrypting step comprises performing a homomorphic encryption operation on the given data block as a function of the value of that data block and the value of its associated counter.

2. The method of claim 1 wherein the homomorphic encryption operation is performed over a designated field.

3. The method of claim 1 wherein the data blocks have respective values $m_1, \ldots m_n$ arranged in an array of n values and the corresponding counters maintained for those data blocks have respective values $c_1, \ldots c_n$.

4. The method of claim 1 wherein the data blocks have respective values $m_{ij}$ arranged in a two-dimensional n-by-r array of values, $1 \leq i \leq n$ and $1 \leq j \leq r$, and the corresponding counters maintained for those data blocks have respective values $c_{ij}$.

5. The method of claim 1 further comprising the step of utilizing at least a subset of the counters to provide integrity protection for respective ones of the stored data blocks.

6. The method of claim 5 wherein the utilizing step further comprises:
storing a message authentication code for a given one of the data blocks, wherein the message authentication code is computed over at least data block value $m_i$ and corresponding counter value $c_i$ using a secret key; and
authenticating the data block using the stored message authentication code.

7. The method of claim 6 wherein the secret key is a secret key of a cloud tenant on whose behalf the data blocks are stored in cloud infrastructure of a cloud service provider.

8. The method of claim 6 wherein message authentication codes computed for multiple respective stored data blocks are combined into a composite message authentication code.

9. A computer program product comprising a non-transitory processor-readable storage medium having encoded therein executable code of one or more software programs, wherein the one or more software programs when executed by the processing device cause the processing device to perform the steps of the method of claim 1.

10. A method comprising the steps of:
maintaining counters for respective stored data blocks; and
encrypting a given one of the data blocks utilizing a value of the data block in combination with a value of its associated counter;
wherein the maintaining and encrypting steps are performed by a processing device having a processor coupled to a memory; and
wherein a given one of the counters is incremented each time the corresponding data block is subject to an update operation.

11. A method comprising the steps of:
maintaining counters for respective stored data blocks; and
encrypting a given one of the data blocks utilizing a value of the data block in combination with a value of its associated counter;
wherein the maintaining and encrypting steps are performed by a processing device having a processor coupled to a memory;
wherein the data blocks have respective values $m_1, \ldots m_n$ arranged in an array of n values and the corresponding counters maintained for those data blocks have respective values $c_1, \ldots c_n$; and
wherein the encrypting step comprises encrypting an i-th one of the data blocks by combining the data block value $m_i$ with an additional value determined as a function of the counter value $c_i$.

12. The method of claim 11 wherein the additional value comprises a one-time pad value determined as a function of the counter value $c_i$.

13. The method of claim 11 wherein the additional value is a pseudo-random function of the counter value $c_i$, such that the corresponding encrypted data block is computed in accordance with the following equation:

$$e_i = m_i + \mathrm{PRF}_k(i, c_i),$$

where $e_i$ denotes the encrypted data block, $\mathrm{PRF}_k$ denotes a pseudo-random function over a symmetric key k, and the addition operation is performed over a designated field.

14. The method of claim 13 wherein the encrypting step comprises encrypting each of the n data block values and wherein the method further comprises transmitting information characterizing the encrypted data block values and the counter values $c_1, \ldots c_n$ to a receiver such that the receiver can decrypt the encrypted data block values by removal of the additional values computed using the respective counter values.

15. The method of claim 13 wherein the encrypting step comprises encrypting each of the n data block values and wherein the method further comprises transmitting information characterizing the encrypted data block values to a receiver that independently tracks the counter values $c_1, \ldots c_n$ such that the receiver can decrypt the encrypted data block values by removal of the additional values computed using the respective counter values.

16. A method comprising the steps of:
maintaining counters for respective stored data blocks; and
encrypting a given one of the data blocks utilizing a value of the data block in combination with a value of its associated counter;
wherein the maintaining and encrypting steps are performed by a processing device having a processor coupled to a memory;
wherein the data blocks have respective values $m_{ij}$ arranged in a two-dimensional n-by-r array of values, $1 \leq i \leq n$ and $1 \leq j \leq r$, and the corresponding counters maintained for those data blocks have respective values $c_{ij}$; and
wherein the encrypting step comprises encrypting an i,j-th one of the data blocks by combining the data block value $m_{ij}$ with an additional value determined as a function of the counter value $c_{ij}$.

17. The method of claim 16 wherein the additional value comprises a one-time pad value determined as a function of the counter value $c_{ij}$.

18. The method of claim 16 wherein the additional value is a pseudo-random function of the counter value $c_{ij}$, such that the corresponding encrypted data block is computed in accordance with the following equation:

$$e_{ij} = m_{ij} + \mathrm{PRF}_k(i, j, c_{ij}),$$

where $e_{ij}$ denotes the encrypted data block, $\mathrm{PRF}_k$ denotes a pseudo-random function over a symmetric key k, and the addition operation is performed over a designated field.

19. An apparatus comprising:
a processing device comprising a processor coupled to a memory;
wherein the processing device is configured to maintain counters for respective stored data blocks, and to perform a homomorphic encryption operation on a given one of the data blocks utilizing a value of the data block in combination with a value of its associated counter.

20. The apparatus of claim 19 wherein the processing device is implemented in cloud infrastructure of a cloud service provider.

21. An information processing system comprising a processing platform which incorporates the apparatus of claim 19.

* * * * *